United States Patent [19]

Vockenhuber

[11] Patent Number: 5,226,123
[45] Date of Patent: Jul. 6, 1993

[54] SYSTEM FOR ADDRESSING MULTIPLE ADDRESSABLE UNITS BY INACTIVATING PREVIOUS UNITS AND AUTOMATICALLY CHANGE THE IMPEDANCE OF THE CONNECTING CABLE

[76] Inventor: Peter Vockenhuber, 1427 Bonvillars, Osterreich, Switzerland

[21] Appl. No.: 499,368

[22] PCT Filed: Jul. 18, 1989

[86] PCT No.: PCT/CH89/00134

§ 371 Date: Mar. 26, 1990

§ 102(e) Date: Mar. 26, 1990

[87] PCT Pub. No.: WO90/01245

PCT Pub. Date: Feb. 8, 1990

[30] Foreign Application Priority Data

Jul. 27, 1988 [CH] Switzerland .......... 2846/88

[51] Int. Cl.⁵ .......... G06F 9/06; G06F 3/00; G06F 7/00
[52] U.S. Cl. .......... 395/325; 395/800; 364/926.9; 364/940; 364/940.1; 364/DIG. 2; 364/264
[58] Field of Search .......... 395/800, 275, 325; 340/825.65, 825.67

[56] References Cited

U.S. PATENT DOCUMENTS

| | | | |
|---|---|---|---|
| 3,646,274 | 2/1972 | Nadir et al. | 370/80 |
| 3,705,595 | 12/1972 | Laakaniemi et al. | 137/824 |
| 3,967,259 | 6/1976 | Lecuyer | 340/508 |
| 4,162,484 | 7/1979 | Abe et al. | 340/150 |
| 4,360,870 | 11/1982 | McVey | 395/275 |
| 4,443,866 | 4/1984 | Burgiss, Sr. | 395/325 |
| 4,468,729 | 8/1984 | Schwartz | 395/425 |
| 4,630,224 | 12/1986 | Sollman | 364/550 |
| 4,633,392 | 12/1986 | Vincent et al. | 395/325 |
| 4,730,251 | 3/1988 | Aakre et al. | 395/325 |
| 5,057,783 | 10/1991 | Gubisch | 340/508 |

Primary Examiner—Thomas C. Lee
Assistant Examiner—Meng-Ai T. An
Attorney, Agent, or Firm—Kenneth M. Massaroni; Patrick J. Coyne

[57] ABSTRACT

An addressing device has an address generator (43), data wire (1), combined address and a supply wire (2) and ground wire (3) that form a cable (1,2,3). This cable (1,2,3) connects to multiple addressable units (14), containing switching means (13), that are connected to the data wire (1). Every addressable unit (14) comprises an address detector (12), which controls the switching means (8,13). The address generator (43) will issue a standardized signal, that will change a parameter by the influence of an impedance member (7) together with the cable length, so that after the commutation of the first switching means (8) and the information transfer via a second switching means (13), the same standardized signal can be used to select the addressable unit of the next cell.

20 Claims, 7 Drawing Sheets

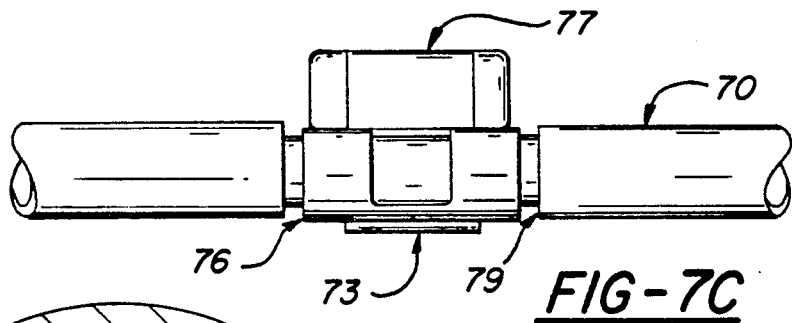
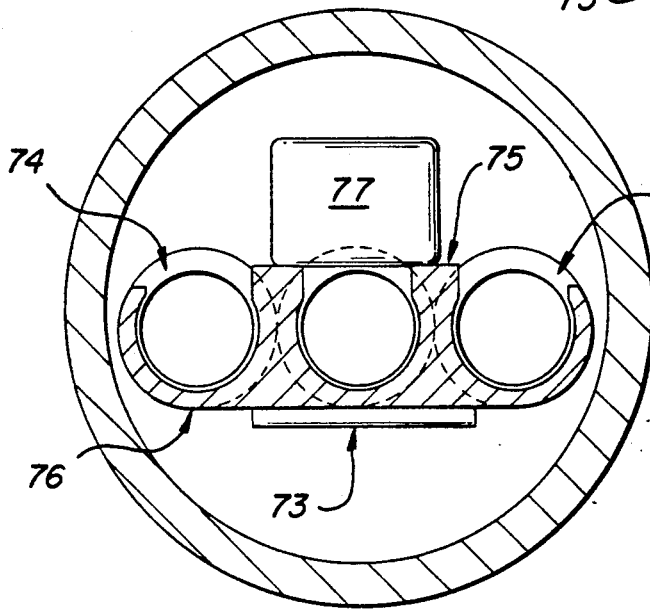
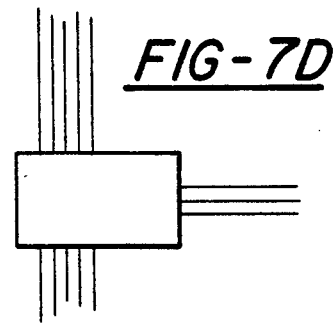
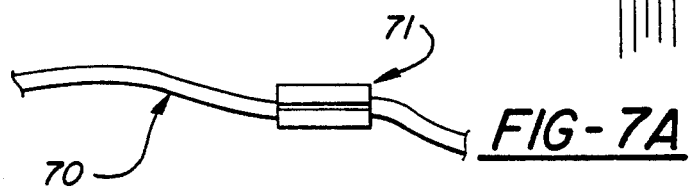
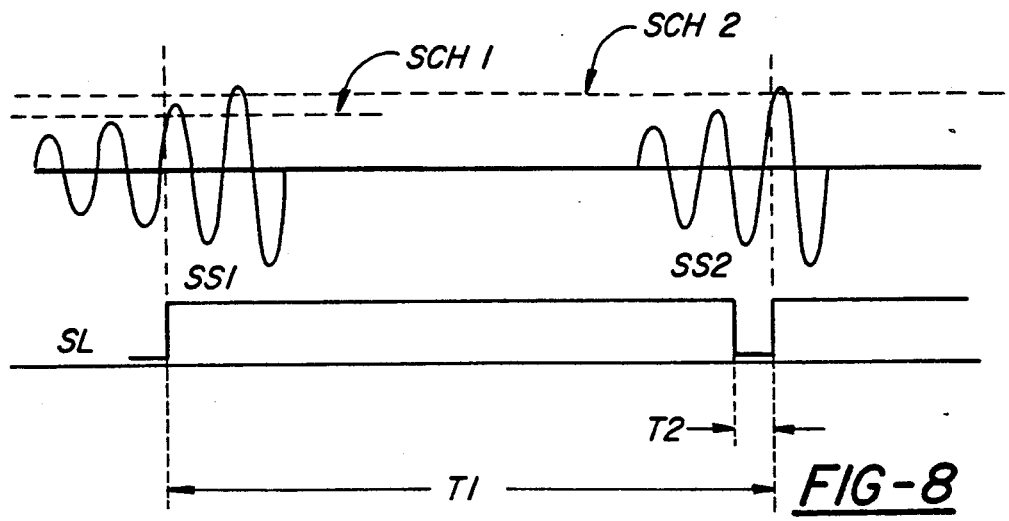

SYSTEM FOR ADDRESSING MULTIPLE ADDRESSABLE UNITS BY INACTIVATING PREVIOUS UNITS AND AUTOMATICALLY CHANGE THE IMPEDANCE OF THE CONNECTING CABLE

BACKGROUND OF THE INVENTION

The invention relates to an addressing device as described in the claims.

Addressing devices of the described kind are used for diverse applications. An example of such an application is found in DE-A-28 00 185, where the cable is used for leakage detection in district heating pipelines by temperature measurement by thermistors. It is evident that the present invention is not restricted to such applications, but can be used in any application where the selection of multiple addressable units is necessary.

U.S. Pat. No. 4,162,484 proposes to select the addressable unit by encoded addresses. Consequently, electronic circuitry to code and decode the address signal is necessary. In EP-A-0 043 431 one can find a proposition for a simplified circuitry where the address code is a predetermined number of pulses, but even here a selecting means for the received pulses and means to code and decode them are necessary.

SUMMARY OF THE INVENTION

The objective of the present invention is to offer the same functions with less electronic circuitry.

A first approach toward the accomplishment of this goal is the insight, that an implicit coding is already done by the alignment of the addressable units along the cable, as one can unambiguously attribute an individual cable length between the cell and the cable terminal processor, to each cell. This insight constitutes the starting point for the invention as described in claims.

As set forth in claims, all the units are now addressable by a standardized signal. The coding of the individual unit's address is accomplished by the cable length, and one address follows automatically after the previous one, and, in consequence, there is no more need for special address encoding. Even when the decoding is considered, the device is greatly simplified, since all the address detectors of the addressable units are now identical which makes them simpler to produce and cheaper.

When the various addressable units are selected, information may be trasmitted via the data wire either from the addressable unit towards the cable terminal processor, as described in the above-mentioned papers, or information may be directed to the various addressable units. One may, for example, transmit a current signal, the value of which is proportional to the information one wants to transmit. When measurement is concerned, one considers the sensing of physical information at the location of the addressable unit and its transmission to the cable terminal processor. In the general case of information gathering, information that is present at the location of the addressable unit is transmitted to the cable terminal processor. The way how the information gathering process is accomplished, either by sensing or by measurement, is arbitrary and of no importance for the present invention. As we will consider the example of temperature sensing in the following text, this constitutes in no way a constraint to the present invention.

Furthermore it may prove advantageous to transmit information that is present in analog or digital format by modulation of a high frequency carrier signal.

The standardized signals need no smooth parameters; it may be advantageous to build the address generator in order to improve the addressing precision and the addressing security. This provides a means to address the next and only the next active addressable unit.

As set forth in the claims a means to provide for better security, as errors may be prevented. Furthermore the reset circuitry provides the transition of all addressable units 14 to their standard configuration which is their starting position for the beginning of an addressing cycle.

A means to address succeeding addressable units when their separation in terms of the impedance of the cable length between them would otherwise be insufficient to sufficiently attenuate the parameter of the standardized signal, that is used to recognize the addressing, between the first unit 14 with closed switching means 8, that follows the cable terminal processor and its sucessòr to prevent a simultaneous detection by both units. It is evident, that this means does not depend on the way of addressing and it is possible to apply it in order to provide for less distance between the addressable units or for a sáfer or more precise adressing.

Further in the claims describe a cascaded addressing device where a great number of addressable units are connected to form a single system.

BRIEF DESCRIPTION OF THE DRAWINGS

More details of the invention can be found in the following description. They are illustrated by examples that are schematically illustrated in the drawings:

FIG. 7a-7d shows drawings of physical realisations of the invention, and

FIG. 8 shows a signal diagram.

DESCRIPTION OF THE PREFERRED EMBODIMENT

Figure 1:
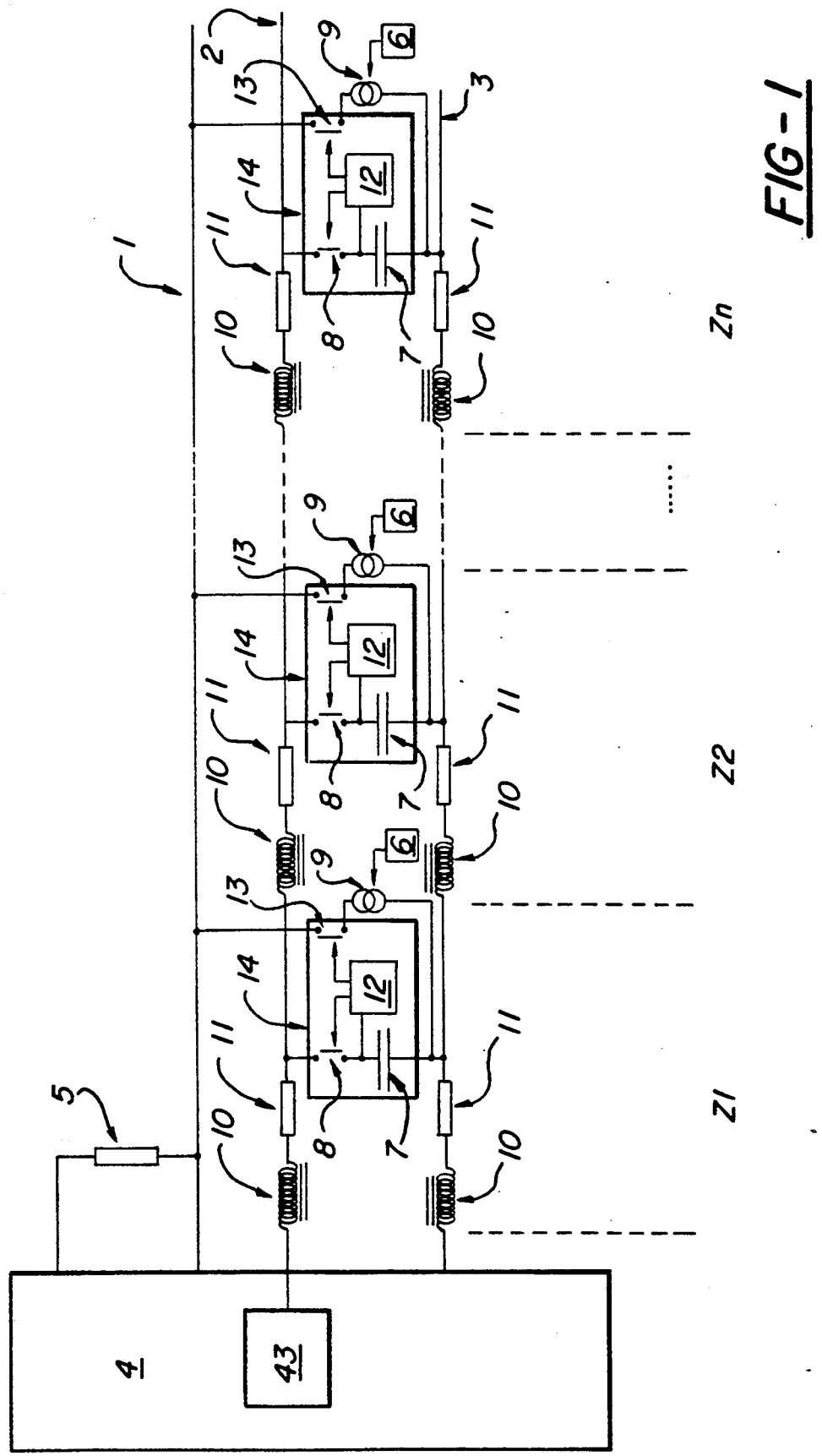
FIG. 1 shows an overall arrangement of the invention.

FIG. 1 shows a typical application of the present invention. It is a temperature measurement arrangement along a line that is defined by the cable. As one can see from the figure, the cable has three wires: an information wire 1, a combined address and supply wire 2 and a ground wire 3.

This realisation of the invention is especially preferrable for certain applications, since it permits to use only three wires. This permits a considerable reduction of fabrication costs.

Figure 2:
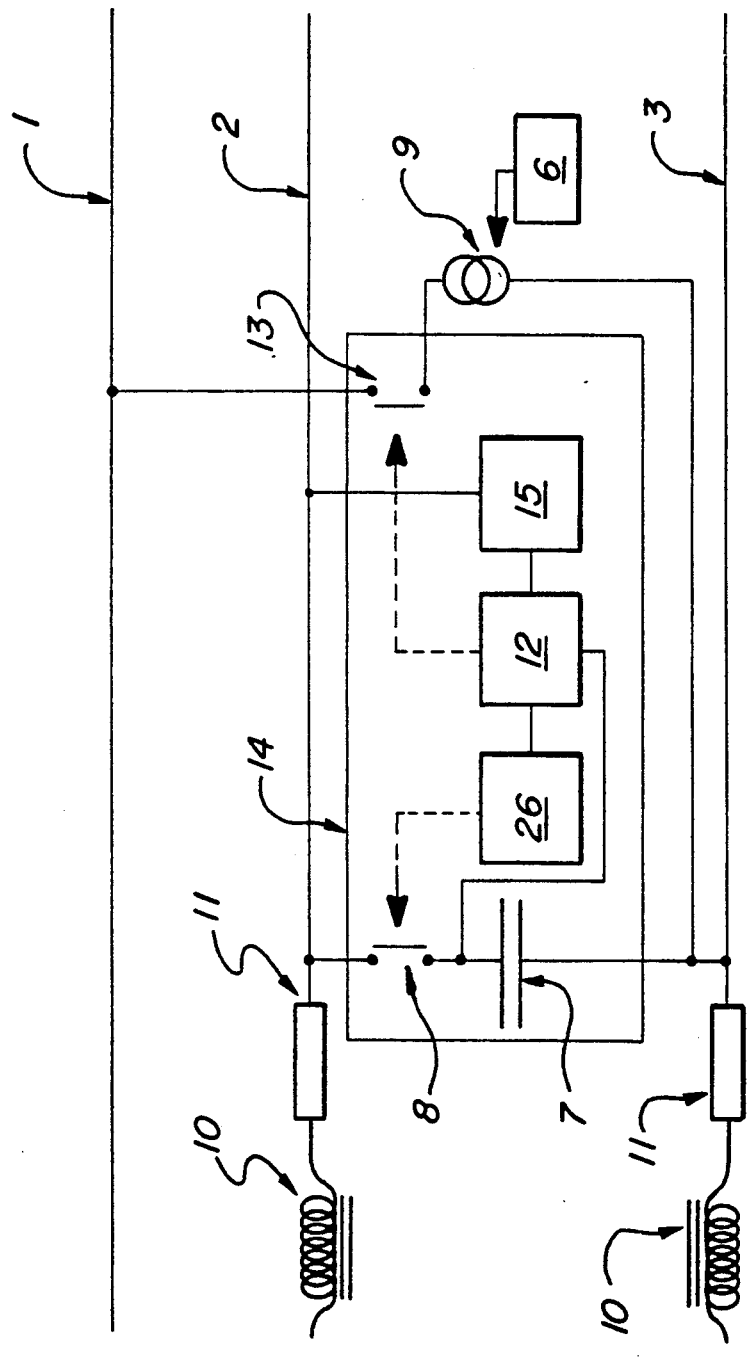
FIG. 2 shows a preferred embodiment of a cell according to the invention that is intended for information input or sensing.

As one can see from FIG. 1 and 2, the arrangement comprises the above-mentioned three - wire cable, the cable terminal processor 4, which generates the standardized addressing signal, reads the signals that originate from the current sources 9, that are commuted by the switching means 13 of the cells and transmitted by the information wire 1 to obtain temperature profiles that are processed further on.

The examples of the invention in the FIGS. 1 and 2 make use of current sources 9, that are programmable by temperature sensors 6, to transmit the information.

One may, for example, use the LM35 sensors produced by National Semiconductors. As one can learn from the corresponding application litterature (National Semiconductor Corporation 1984 Linear Supplement Databook page S 8–6) such a sensor may control a current source to produce a current signal that is proportional to the temperature. On the same page of the cited manual one can find a proposition for the transmission of the sensor signal by voltage through a cable with twisted wires. This technique of information gathering and information transmission could typically be used in the context of the present invention.

The transmission of the information by a current signal offers the advantage that the cable resistance will not influence the quality of the transmission of the measured value. In this case it is preferrable to use a temperature sensor with an integrated programmable current source as offered, for example, by the Analog Devices Company (AD590).

The centralized cable terminal processor 4 establishes the correspondence of the voltage, that is measured by the measurement resistor 5, which corresponds to the transmitted current, and to the temperature at the individual addressable unit, which was active during the measurement.

The cable terminal processor 4 procedes in two cycles, that are described as follows:

The supply voltage between the combined supply and address wire is first set to zero. Then it is driven to a predetermined nominal value. The reset circuitry 15 which is present in every addressable unit 14 (FIG. 3) will provoke a defined state of that unit, where the switching means 8 are closed, and the switching means 13 are open.

This will charge all condensers 7 which stand for the impedance member in the example. Their discharge time may be used to determine the time interval while information will be transmitted by the information wire 1.

The figures show the cable impedance of the combined address and supply wire 2 and of the ground wire 3 by the symbol for an inductor 10 standing for the inductance, and for a resistor 11 standing for the ohmic part of its impedance. A possible capacitive part of the cable impedance is not represented.

The FIGS. 1 and 2 show combined address and supply wires 2 while in other figures a dedicated supply wire 21 and a dedicated address wire 20 are shown. In order to prevent confusion, the designation of the combined wire was chosen to be 2, and in all cases where the supply and the addressing function are accomplished by separate wires, the designation will be 20 or 21 respectively.

As one can see from the figure, the impedance, that is seen from the cable terminal processor 4 is very low for high frequencies, as the attenuation by the impedance member 7 is important if the switching member 8 is closed.

Soon after power up, the system is automatically brought in its default state by the reset circuitry 15, and the cable terminal processor 4 sends the standardized signal via the combined address and supply wire 2, which may be a high frequency signal burst of steadily increasing amplitude. The cable terminal processor increases the amplitude of the signal up to a point where the address detector 12 of a cell Z1 changes state, and closes the switching means 13, that is connected in series with the temperature dependent current source 9. Every cell $Z1 \ldots Zn$ comprises a switching means 13, and the corresponding driving means 6 to 12. The address detector 12 may be a selective frequency filter and an amplitude detector. This constraints the detector exclusively to the addressing frequency while the detection may be done by a diode rectifier followed by a trigger circuit.

Of course it is possible, and it may under certain circumstances be the preferred technique, to detect another parameter of the standardized signal instead of its amplitude at a certain frequency, for example its pulse width. For this case the cable terminal processor and the address detector must be changed accordingly.

Figure 3:
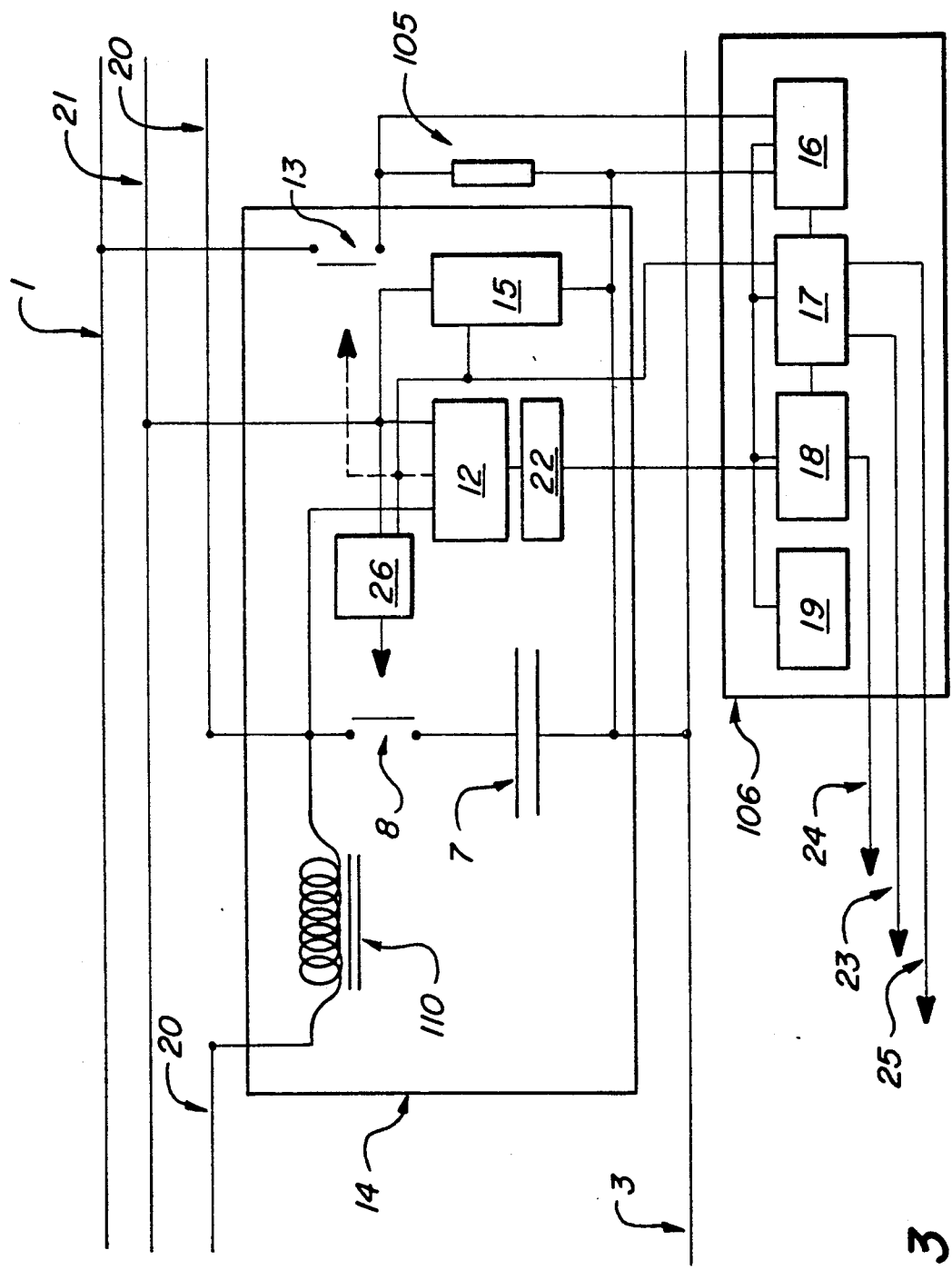
FIG. 3 shows a preferred embodiment of a cell intended for information output or control.

'The attenuation of the standardized signal's parameter is influenced by the electrical properties of the switching means 8, as can be seen from the FIGS. 2 and 3. This switch may be a transistor, a field effect transistor or a relay. As this choice will influence the impedance that is responsible for the attenuation of the parameter of the standardized signal, it may be preferable, to input the signal for the address detector directly from the address wire 20 or from the combined address and supply wire 2. This is illustrated in the example of FIG. 3, where the input of the address detector 12 is directly connected to the address wire 20, contrary to the other examples, where this input is connected to the output of the switching means 8. (which corresponds to the input of the impedance member 7).

In the case where short distances between addressable units are concerned it may be advantageous to cut the addressing wire and to insert an inductor 110 at the location of the addressable unit. The cable impedance per unit length remaining constant, one can obtain shorter distances between the addressable units 14.

As soon as the address is recognized, the switching means 13 is closed, and the measurement signal flows through the data wire 1. The opening of the second switching means 8 will preferrably be provided only after a certain delay time, which is generated by the delay generator 26 (FIG. 2). This delay generator 26 provides sufficient time for the cable terminal processor to stop sending the standardized signal. Otherwise the next cell, which is situated one address further away from the cable terminal processor, will detect the presence of the addressing signal as soon as the switching means 8 opens.

As the switching means 13 closes, a current, that is proportional to the temperature, will flow through the data wire 1 to the cable terminal processor where it is measured by the measurement resistor 5.

The example of FIG. 1 supposes that even for very low temperature values there will always be a minimal current flow. This minimal current corresponds to a minimal voltage across the meansurement resistor 5. If this minimal signal is measured, the cable terminal processor 4 stops sending the standardized signal.

The arrangement of the invention provides that exactly the first addressable unit 14, which is nearest to the cable terminal processor 4 detects the address. This is accomplished by the state of the addressable units 14, where all switching means 8 are closed. The attenuation of the standardized signal's parameter between the cells is thus maximal and very progressive; the farther the individual cell is away from the cable terminal processor 4 the greater is the attenuation of the standardized signal's parameter because of the cable length and/or the impedance members 110, that are integrated into the addressable units 14 (FIG. 3).

During the second part of the so-started addressing cycle, one addressable unit 14 after the other is selected by the cable terminal processor 4. The amplitude of the standardized signal is constantly incremented, compensating for the impedance which increases with increasing cable length. A counter 49 in the cable terminal processor (FIG. 5), which is incremented at every measurement provides for the correspondence of the measured values to the temperature profile for further processing.

Every cell switches to an idle state, once it has been addressed and the corresponding information has been transmitted. It does so by opening both switching means 8 and 13 and, at the same time, by separating the impedance member 7 from the rest of the cable.

A cell that is separated from the cable is electrically isolated from it. As it is inactive, the only means to bring it back again to its starting state is a reset cycle as described above.

The example of an addressable unit 14, that is illustrated in FIG. 3 shows an execution of the present invention using a four-wire cable. Besides the data wire 1 and the ground wire 3, that have the same functions as in the previous figures, a supply wire 21 provides the supply voltage for all electronic components of the addressable units 14. In this example, the address wire 20 is separated from the supply wire 21. In order to symbolize that the cable in the example has an impedance that can be neglected, the equivalent symbols 10 and 11 for that impedance of the corresponding wires of the cable have been omitted in FIG. 3. The addressing wire was cut in two at the location of the addressable unit, and an impedance member 110, which is part of the addressable unit, is inserted in the cable.

FIG. 3 shows an example of an embodiment of the invention for information output. In this case the information will be transformed into a current signal by the cable terminal processor 4, which is measured at the location of the addressable unit by a measurement resistor 105, and which is eventually transformed to a usable signal. This signal is output by the information output unit 106. Such an arrangement may be used to control a large display that covers an important surface, or the power distribution of a resistive heating element by adequate switching means.

The reason why the information transfer is done by a current signal in this example, is that the cable impedance is not an influencing factor, and the information arriving at the location of the addressable unit does not depend on the cable length. Is is evident that this advantage does not depend on the way how the cell is addressed. The transmission of the information may be accomplished by a proportional voltage or, as usual in telecommunications by a modulated carrier frequency. The special execution of the converter that resides at the location of the addressable unit has to be adapted in accordance with the informations transmission.

The arriving information is converted to a voltage across the measurement resistor 105, and to a digital signal by an analog to digital converter 16. The outputs of this converter are stored in a latch circuit 17, whose output lines provide the signal that corresponds to the transmitted information.

In the case of the transmission of a binary information, the analog to digital converter will be replaced by a schmitt trigger, and the transmitted information is one bit per cell or addressable unit. It is evident, that one can transmit information in a serial manner in any of the two possible directions by a bitstream, where the bits are separated by a delay, while the addressable unit is addressed. Another evident possibility is the transmission of a number of parallel bits that are encoded by one of the above mentioned modulation techniques. The following examples do not consider these possibilities and they refer to an analog to digital converter.

The example of FIG. 3 transforms the arriving information to a usable signal by the means of an analog to digital converter 16 which has a differential input. The differential input provides that only the voltage across the measurement resistor 105 contributes to the generation of the usable signal and the impedance of the cable between the cable terminal processor and the measurement resistor will have no influence.

The time when the data from the analog to digital converter 16 are transferred and stored into the latch 17, is determined by a delay generator 22, that issues a signal after a fixed delay counted from the recognition of the standardized signal by the address detector 12. This delayed transfer excludes any influence of parasitic capacitors between the cable wires and makes sure, that the current in the data wire 1 is stable and the analog to digital conversion is finished.

When the delay time is expired the delay generator 22 will issue a signal to a signal forming means 18 which will in turn issue a strobe signal to the latch 17, and the data at the output of the analog to digital converter are transferred to the latch.

Depending on diverse applications, it may be advantageous to dispose of this strobe signal at the cable's information output unit 106. In certain applications it may be advantageous to monitor the orderly working state of the cable by an adequate means (so called 'watchdog' circuitry) This could be accomplished by checking during fixed time intervals if a strobe signal 24 has been isssued by the system, in which case one can certainly assume that its address detector 12 was selected. If the strobe signals are issued in time intervals that are too long or too short, one can conclude that the system must be in an erroneous state. A similar reasoning holds for the signal 25 that is generated by the reset circuitry 15 which must be regular in time can be used to monitor the orderly working state of the device.

When the address recognition by the address detector 12 is over, and both switching means 8 and 13 are opened, and the addressable unit 14 brings itself in a state of high impedance, provision is made, that the transmitted data are stored in the latch and remain unchanged at its outputs 23, where they will stay up to a cycle where the cable terminal processor 4 will load new values.

After completion of a complete addressing cycle, all switching means 8 are in the open state. In order to start a new cycle, beginning with the first addressable unit 14 which is located nearest to the cable terminal processor 4, the cable terminal processor resets the supply line 21 to zero volts. The reset circuitry 15 that is present in every addressable unit 14 will bring all the switching means 8 in the closed state, and the switching means 13 in the open state when the supply voltage is set to its nominal value. As soon as the supply voltage has stabilized, the address detector circuitry 12 will hold the switching means in their state.

It is evident, that one may prefer a variant of the present invention where the reset signal is furnished by a combined address and reset wire to the addressable unit while a dedicated supply wire will supply all addressable units. In this case, one could distinguish between the address signal and the reset signal by their duration.

As already mentioned, it may be of interest, to dispose of these cycles at the output 23 of the addressable unit 14. This is the reason why in the example of FIG. 3 an output signal of the reset circuitry 15 is drawn to the latch 17 where it may be one of the ouput bits 25 of the unit. The information, that is carried by this signal is not stored in the latch. The drawing shows symbolically that the reset signal and the signal coming from the delay unit 22 on the output 24 indicate, that the addressable unit 14 is addressed. The signals are output by the information output unit 106, where they may be monitored, as already mentioned, by a 'watchdog circuitry'.

As can be seen in FIG. 3, provision is made for a local energy supply 19, in order to maintain the output information, stored in the latch 17, during the reset cycle. This energy supply can be a condensator that bridges the short time while the reset pulse is active on the supply wire 21. An alternative solution is to provide a dedicated reset wire while the supply wire remains always active. In this case one would supply the ouput units 16 to 18 by the supply wire, and there would be no more need for the energy supply 19.

Figure 4:
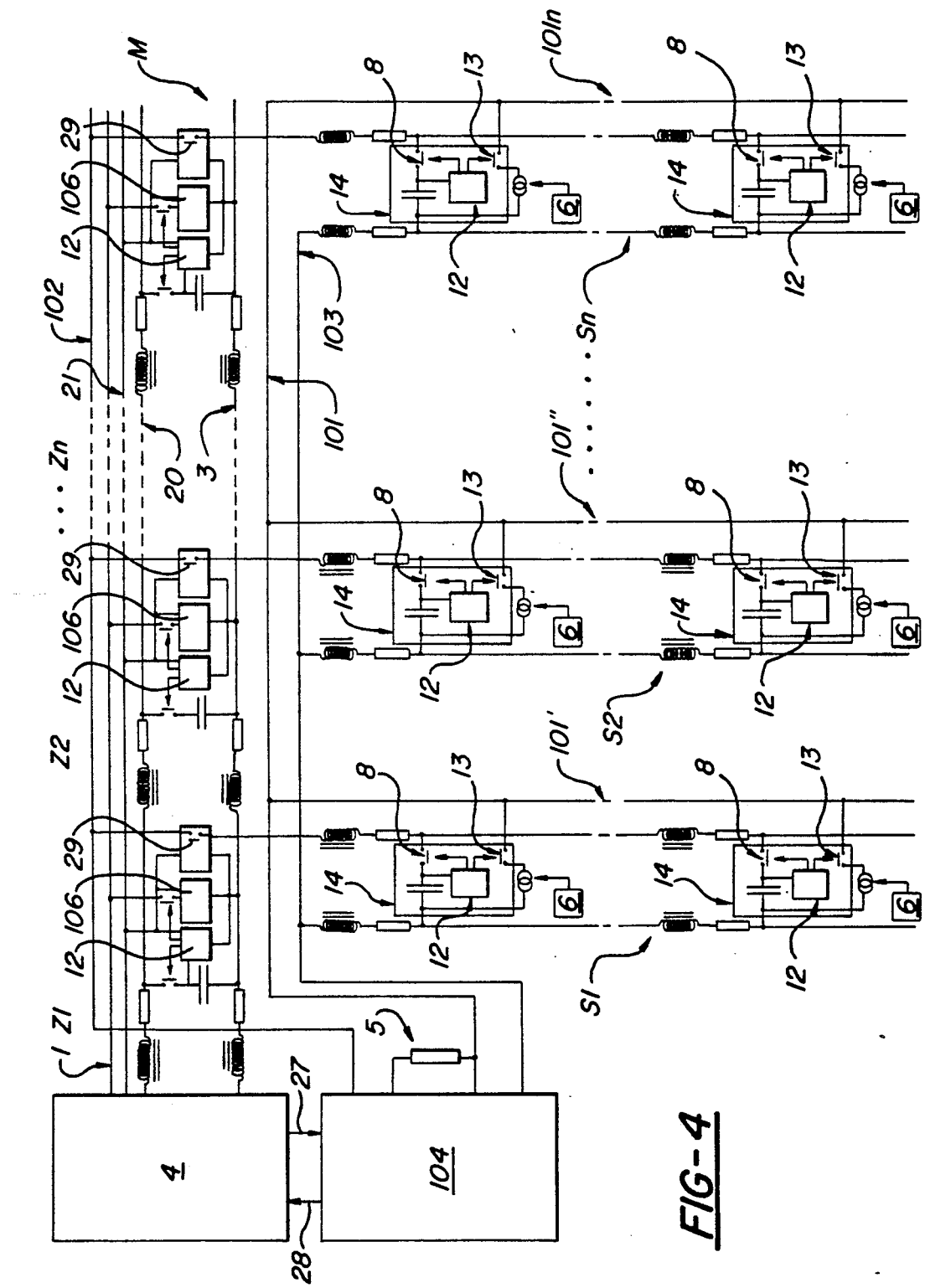
FIG. 4 shows a cascaded arrangement of cells according to invention.

The example that is illustrated in FIG. 4 is a cascaded arrangement of addressing devices of the form that a master device M with a cable terminal processor 4, data wire 1, address wire 20 and a supply wire 21 (as in the example of FIG. 3), controls a number of slave devices S1, S2, . . . Sn, where the latter dispose of a common data wire 101, a common address wire 102 and a common ground wire 103, and are controlled by a slave cable terminal processor 104 that is controlled by the master cable terminal processor 4. If necessary, the functions of the slave cable terminal processor may be accomplished by the master cable terminal processor. The address wire 102 is a combined address and supply wire.

The first action to take, to address the slave devices S1 to Sn is to address the cells Z1 to Zn. This is accomplished in the previously described manner by the use of a standardized signal. Every cell Z1 to Zn has an information output device 106 and a switch 29, the state of whitch is determined by the transmitted information. This switch 29 commutes the combined address and supply wire 102 of the slave devices S1 to Sn.

The master cable terminal processor 4, by appropriate circuitry, provides that one and only one of the slave devices is connected to the slave cable terminal processor 104. This means that after the first complete addressing cycle of the master device M by its cable terminal processor 4, all switches 29 are in the same state except the first switch 29 of the cell Z1, which is closed. As all the switches 29 are now in their working configuration, the signal issued by the line 27 has the effect that all cells of the slave device S1 are addressed, and, when finished, the cable terminal processor 4 gets the information by a signal issued on the feedback line 28, meaning that all the cells of this slave device S1 have been addressed, and all its switching means 8 and 13 are open. Now the master cable terminal processor 4 will re-address the cells Z1 to Zn, where the switch 29 of the next cell will be opened and all the others closed, in order to address the following slave device S2.

If preferred, all the addressable units may be of the same type as illustrated in FIG. 2, but if neceassary it is possible to connect information output units 106 instead of the sensors 6 to the cable or to provide for a mixed connection of information input units and information output units.

The example in FIG. 4 shows that the common data wire 101 is common to all slave devices S1 . . . Sn whose data wires 101' . . . 101n are permanently connected with it. In cases where one wants to address a great number of addressable units 14 by a slave cable terminal processor 104, it may prove advantageous to provide for switching means that are parallel to the switches 29 and that open and close simultaneously that connect the individual branches 101', 101" to 101n.

In the case where the the switching means 13 of the corresponding addressable units are realized by transistor switches, that have a very high but finite off - resistance, and where a great number of such switches are connected in parallel where all of them are closed beside one (and only one), which is open for the purpose of information transmission, this may result in an unacceptably low resistance against the ground wire 3. This will degrade the transmission of the information from the addressed unit, especially when the transmission is acomplished by a proportional current. By a variation of the arrangement drawn in FIG. 4, where the data wire 101 of the addressable units of the branches S1, S2, . . . Sn are connected as described in the previous paragraph, one can circumvent this problem.

It is of course possible to extend the cascading of the present invention indefinitely. In replacing the temperature sensors 6 of the slave devices S1, drawn in FIG. 4, by switching means 29 and the corresponding information output units 106, that are addressed by the cable terminal processor 104, one can obtain three- and higher dimensional arrangements of the invention. The slave device could eventually control a subslave cable terminal processor whose address—and/or data wires are first selected by a switching means 29 of the master device, addressed by the cable terminal processor 4, and then serially by a further switching means that correspond to the switching means 29 but addressed by the slave device S1, which is, in turn addressed by the slave cable terminal processor 104. A subslave cable terminal processor, that is not drawn in the figure, will finally read the temperature values of the sensors that are addressed by this technique.

A similar arrangement is possible, where addressing devices are cascaded in a manner, where instead of a single cable terminal processor 104 multiple cable terminal processors 4 are provided in parallel, and all cable terminal processors address their slave devices simultaneously. This offers the advantage of a quicker addressing cycle than the arrangement of FIG. 4.

If devices are cascaded, the addressing cycle goes on as follows:

The master device M addresses all cells Z1 to Zn by its cable terminal processor 4, and issues an information via the data wire 1 that will close the switch 29 of the information output unit 106 of the first cell Z1, and open the switches 29 of the information output devices of all the other cells Z2 to Zn.

The address wire 102 of the slave cable terminal processor is now connected to the slave device S1 by the switch 29 of the master device M, and the master cable terminal processor 4 issues a signal 27 that will start the addressing cycle of the slave cable terminal processor 104, who, in turn, will address all addressable units of S1.

Having addressed all addressable units, the slave cable terminal processor 104 issues the signal 28, and the master cable terminal processor 4 will reload all of the information output units 106 that belong to the master device M, and provide the information so that the switch 29 of the first cell Z1 will open, the switch 29 of the second cell Z2 will close, and the switches 29 of all the other cells up to Zn will open.

This connects the address wire 102 of the slave cable terminal processor 104 to the slave device S2, and the slave cable terminal processor 104 can select the second slave device S2.

This process is repeated up to a point where the last slave device Sn has been completely addressed by the slave cable terminal processor 104. The master cable terminal processor 4 will eventually open the switch 29 of the last cell Zn and start over again by closing the switch of the first cell Z1.

Figure 5:
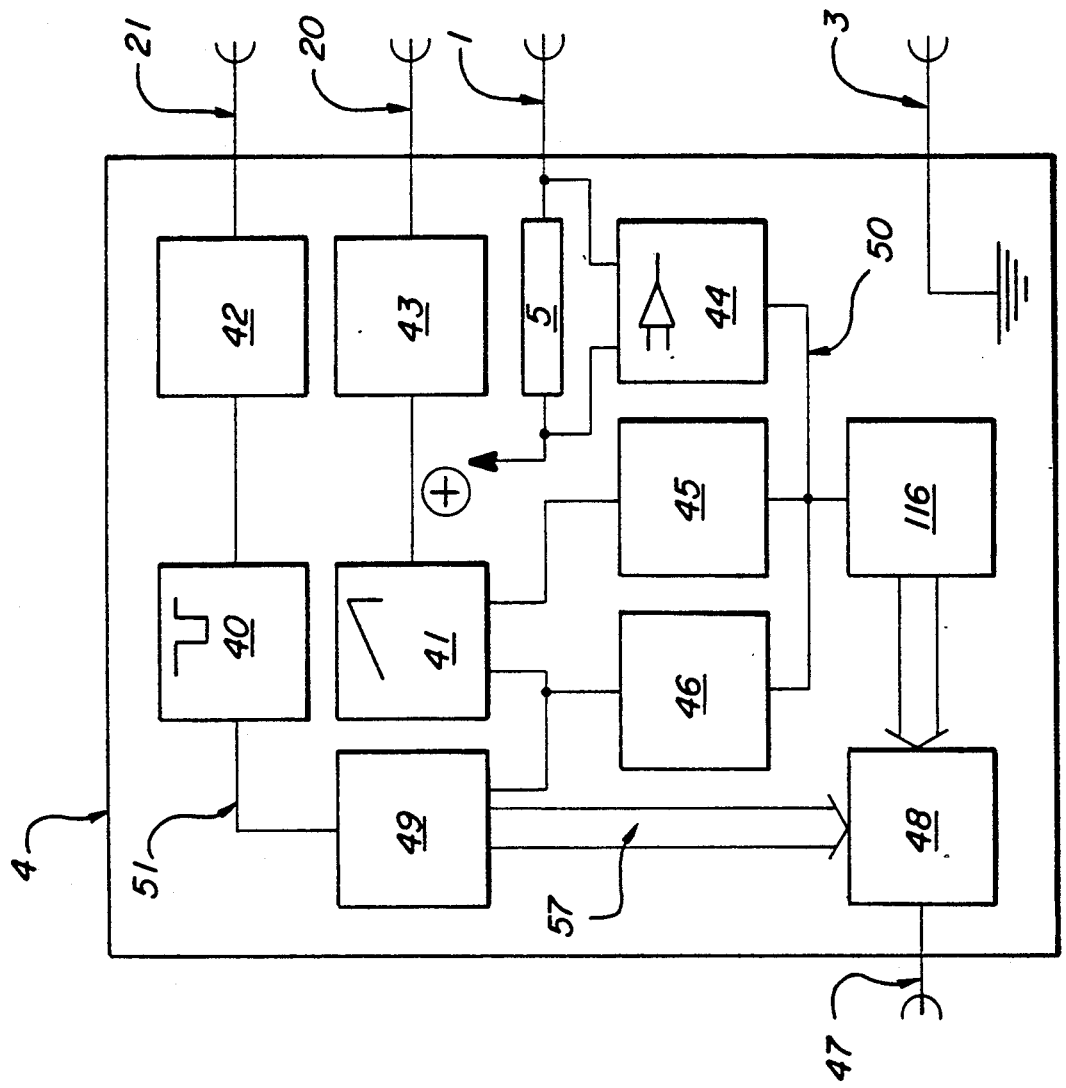
FIG. 5 shows of a embodiment cable terminal processor.

FIG. 5 shows a preferred execution of a cable terminal processor 4. It is an execution for a four wire variant of the invention. Correspondingly, the ground wire 3, the data wire 1, the supply wire 21 and the address wire 20 are connected to the cable terminal processor.

If one wants to operate a three wire version of the present invention, it is sufficient to combine the supply wire 21 and the address wire 20 in the scheme of FIG. 5 by connecting the output 20 of the address wire to the supply wire 21 by a condensator. The latter will provide the combined supply- and address wire 2.

If one wants to use a five wire version of the invention with the cable terminal processor 4, one may add one more output line besides the outputs that are drawn in FIG. 5, which connects to the output of the monostable element 40 and to the corresponding reset wire of the cable.

It is evident, that one may drive a four wire version of the present invention that comprises a combined address and supply wire 2, a ground wire 3, a data wire 1 and a reset wire. Such an arrangement may offer cost advantages where one wants to replace the reset circuitry that must otherwise be present in every addressable unit by a corresponding reset wire and a reset input.

The cable terminal processor 4 drawn in FIG. 5 is provided for information gathering and might connect for example to sensors (FIG. 1); the measured values are written in a storage device 48, and can be processed by a computer which is not shown in the figure. For this purpose, data output lines 47 are provided.

The example of FIG. 5 shows an information transmission method by a current through the data wire 1 which will be converted by the measurement resistor 5 and a differential amplifier 44 into a usable signal 50. This usable signal is fed to the input of the analog to digital converter 116, who transfers the converted values into the memory element 48. In the example of FIG. 5 the usable signal is generated by difference amplification referred to a fixed voltage that is present in the cable terminal processor 4. This is symbolized in the drawing by a "+" symbol.

A counter 49 with its outputs 57 connected to the address inputs of the memory element 48 provides a means to establish the correspondence of the address along the cable 1,3,20,21 with the address of the memory element 48. One will preferably store the values from the first addressable unit Z1 (FIG. 1) in the first memory address, the value of the second cell Z2 in the second memory address and so forth. The maximal permissible memory address of the memory element will preferably be at least as high as the number of addressable units, that have to be treated, but it may be less if the gathered data are already processed before the last cell has to be loaded.

The increment from one addressable unit to the next is accomplished as follows:

As soon as the comparator element 45 finds a usable signal that is less than a certain minimal value, it starts a ramp generator 41 whose voltage defines the amplitude of the address generator 43. The latter will start to send the standardized signal with steadily increasing amplitude.

As soon as the first addressable unit of the first cell Z1 (FIG. 1) has recognized the standardized signal, it will close the switch 13, and send a signal in the form of a current that is proportional to the measurement sensor 6. One provides that this current is higher than a minimal value when the system is in an orderly state. A comparator 46 keeps comparing the usable signal 50 with this minimal value; if it is less, the comparator issues a signal to the ramp generator 41, which cause it to reset its output. The consequence is, that the address generator 43 will stop sending the standardized signal.

It is advantageous to use the signal that is issued from the comparator 46 to increment the counter 49 by one, as shown in FIG. 5.

As soon as the usable signal will fall below the minimal value that is detected by the comparator 45 by discharge of the impedance member 7 (FIG. 1) of the addressed addressable unit, the same cycle starts over again. The addressing process is repeated as described until an overflow signal 51 from the counter 49 indicates that the last addressable unit has been selected.

This overflow signal 51 is used as a reset signal and it is input to the monostable element 40 that constrols the supply unit 42. This provokes a short pulse on the supply line and all the reset circuits 15 of the addressable units 14 will bring them in the normal starting state which is characterized by all switching means 8 being in the closed state and all switching means 13 being in the open state.

If the addressing device is connected to information output units 106, as illustrated in the example of FIG. 3, the direction of information flow reverses.

In this case, the control of the standardized signal of the cable terminal processor 4 is accomplished in the following way: Instead of monitoring the exceeding of a fixed value of the usable signal 50, one monitors the voltage that will be lowered by the switching means 13 of the addressable unit closing and shorting the signal on the data wire 1 with the ground wire 3 through the measurement resistor 105 (FIG. 3). This instance will be the moment where the emission of the standardized signal will be stopped.

Further one measures the instance when the information transmission is over, by monitoring the voltage rise resulting from the opening of the local switching means 13 of the selected addressable unit 14, as the measurement resistor is no more shorted to the mass wire. This instance will be the moment when the ramp generator 41 restarts.

Of course one will have to replace the analog to digital converter 116 with a digital to analog converter and read from the memory element 48 instead of writing into it. The data in the memory element are the results of some algorithm that is executed in an arbitrary computer which is not shown in FIG. 5 and which is connected to the inputs 47.

One finally has to replace the measurement resistor 5 of the cable terminal processor by a programmable current source connected to a digital to analog converter if one wants to use the device for information ouput control. The current of that current source will be measured at the local addressable units of the corresponding cell Z1 . . . Zn (FIG. 1) by the measurement resistors 105 (FIG. 3) that are provided for that purpose.

Figure 6:
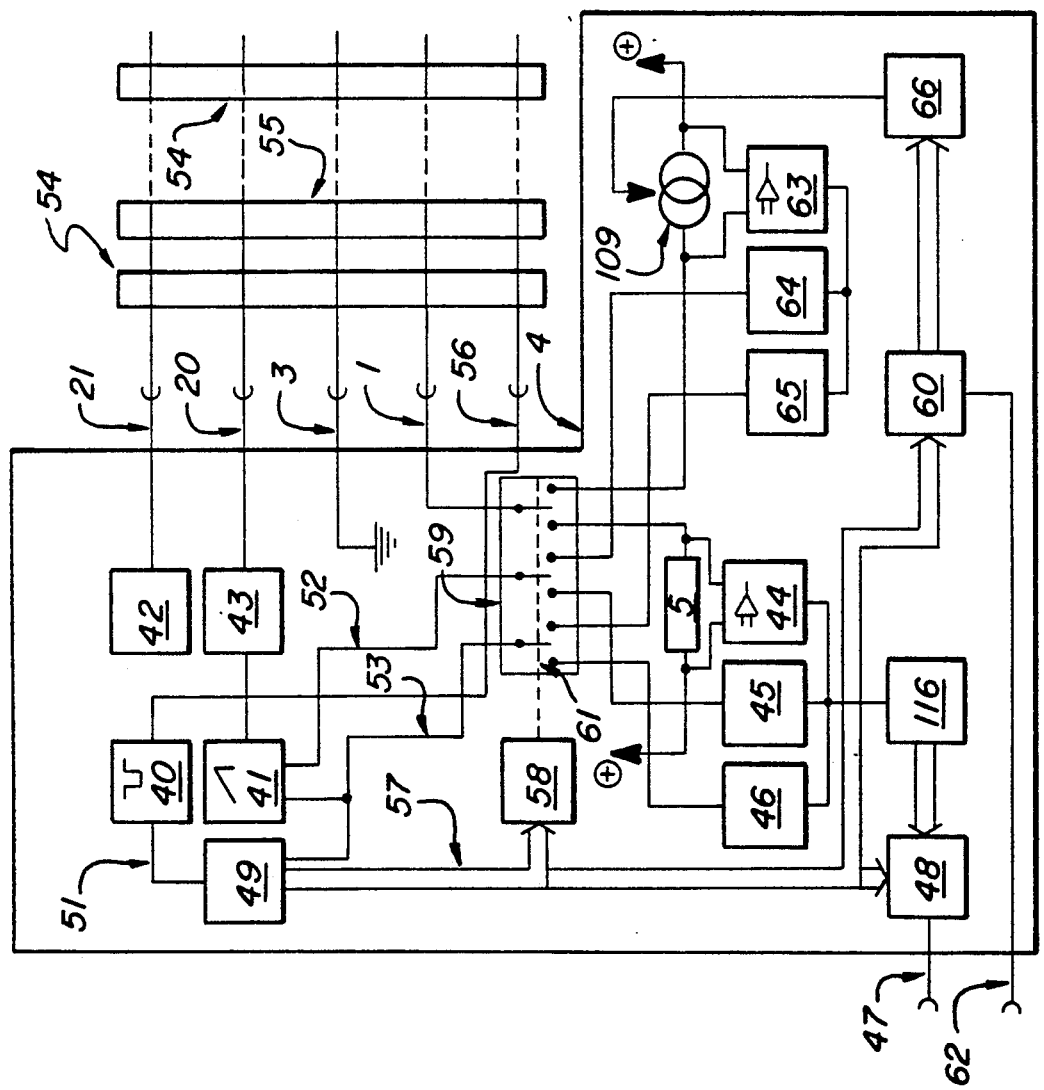
FIG. 6 shows an embodiment of the invention comprising information input and information output devices on a single cable intended for combined sensing and control applications.

The arrangement drawn in the example of FIG. 6 shows the simultaneous connection of information input units IN 54 and information output units OUT 55 to the same cable. The cable that is assumed for this example is a five wire version of the invention. Besides the supply wire 21, the ground wire 3, the address wire 20 provision is made for a reset wire 56, that will issue a signal to render all addressable units in their normal staring state once the information input and output cycle is finished. The corresponding reset signal is taken from the overflow signal of the counter 49 as in FIG. 5. The supply unit 42 will correctly supply the supply wire 21.

One finds in FIG. 6 the ramp generator 41 which has a reset input 53 and a start input 52 and whose output signal is connected to the address generator 43 and determines the signal amplitude of the latter. This generator 43 provides the standardized signal for the address wire 20 of the cable. The reset signal at the input 53, which will always be active when a cell Z1 . . . Zn (FIG. 1) was sucessfully addressed is fed to the input of the counter 49 and will increment this counter by one up to a point where the last address is reached and the overflow signal 51 indicated the end of the addressing cycle.

At the output of the counter the address lines 57 indicate always the position of the addressable unit along the cable 1,3,20,21,56. This address lines are connected to two storage elements, namely the storage element 48 of the FIG. 5, and another storage element 60, where the latter is provided for data output, the data being input into the device by an arbitrary computer that is connected to the connector 62. The data on the address lines at the output of the counter 49 will garantee the correspondence between the contents of the storage elements with the location of the values that are input or output from or to the cable.

One will preferably attribute the first address to the location of the first addressable unit and so forth, exactly as described in FIG. 5.

The address wires 57 that are outputs of the counter 49 are connected to another storage element 58 as can be seen from FIG. 6. This storage element contains a binary number for every addressable unit. The value of that number depends on whether the concerned addressable unit 14 is equipped with an information input device 6 or with an information output device 106.

The data output 61 of the storage element 58 showing always this binary number is fed to a triple switch 59. His three independent switches are synchronously commuted between two alternative positions depending on the state of the signal 61.

The first contact that is commuted by the triple switch 59 is the data wire 1 which will alternatively be connected to a programmable current source 109 in the case of information output, or, in the case of information input, from a sensor 6 (FIG. 1) to the measurement resistor 5.

On the other side both control inputs, the start signal input 52 and the reset signal input 53 of the ramp generator 41 are commutated between two alternative comparators that measure the presence of the minimal signal in the case of information input and the decreasing in cable impedance due to the closing of the switching means 13 of one of the addressable units in case where information is output. When information is input, the comparator 45 will start the ramp generator 41 when the signal at the output of the measurement amplifier 44 is lower than a minimal value, and the comparator 46 will reset the ramp generator as soon as the signal is higher than a minimal value. When information is output, the voltage that is necessary for the generation of a minimal current value by the current source 109 is measured by a measurement amplifier 63, which will preferentially be a difference amplifier, and this voltage is compared to a minimal value. If one needs very high values of this voltage in order to create that minimal current, or if the current source 109 is saturated one concludes that the switching means 13 of the next addressable unit, that is not yet in the state of high impedance, is still open. As soon as the standardized signal is recognized and the concerned switching means closes, at least the minimal current will flow through the local measurement resistor 105 (FIG. 3), and the voltage of the current source, which is necessary for that current will lower correspondingly. This situation is detected by the comparator 65, which will issue the signal for the reset input 53 that stops the ramp generator 41 via the triple switch 59. In a similar manner the ramp generator 41 will be started when the signal that is measured by the measurement amplifier 63 at the current source 109 indicates, that the switching means 13 of all addressable units are closed.

The current source 109 and the measurement resistor have a common power supply, that is internal to the cable terminal processor 4. This is symbolized by a "+" sign in the example of FIG. 6.

Inserted in the signal path between the storage element 48 and the measurement amplifier 44 is the analog to digital converter that has already been mentioned. In an analogous manner, a digital to analog converter is inserted between the storage element 60 and the programmable current source 109.

All applications of the present invention have in common, that sources or sinks of information that are located at the addressable unit along the cable are transmitted from or to a common cable terminal processor.

FIG. 7a shows a cable that corresponds to the present invention that comprises an address wire, an information wire, a supply and/or data wire, that are contained in a cable 70 where in regular or irregular distances addressable units are attached, using a wellknown clips-technique, where the units are protected by a housing 71.

The FIG. 7b shows such an addressable unit, which is fastened to the cable by a clips - technique. The clips 73, forming the addressable unit is connected to a support 76 which has pins 75 which are able to penetrate the isolation of the wire. A condensator 77 which is the impedance member of this example is bonded to the support 76. The cell is surrounded by a protective housing 71.

FIG. 7c is a blown up representation of FIG. 7a where the outer protective cover 79 of the cable 70 has been removed in the region where the addressable unit is attached. The support 76, the condensator 77 and the electronic circuit 73 are visible where the cable is still isolated but has no protective cover.

FIG. 7d shows schematically an addressable unit which is attached to the cable and which corresponds to FIG. 4.

FIG. 8 shows a signal diagram for a sequence of standardized addressing signals. SS1 designates a first, and SS2 a second signal that follows the first one.

When the first standardized addressing signal SS1 is sent, the first addressable unit will recognize it at the first threshold SCH1, as the impedance after the first addressable unit is lower, which will lower the signal. The first addressable unit will be transferred into the active state, where a transmission of information is possible, after recognition of the signal threshold SCH1 which corresponds to the signal parameter. The active state of the information wire SL is represented in FIG. 8.

As soon as the time $T_1$ of information transmission is over, a new standardized signal SS2 is sent, which will be recognized in the addressable unit which geometrically follows the first, now inactivated addressable unit, by exceeding the value SCH2, which will activate the data wire SL for a new periode $T_1$. The time interval $T_2$ between the end of an arbitrary information transmission and the start of a successive new transmission may be choosen to be very short in order to achieve a near to optimal addressing frequency.

A version of the invention is provided, where the threshold of every addressing cycle is stored, so that a repeated sending of the standardized signal can start with an amplitude of the order of the threshold. The accumulation of the impedance values of the cable sections between the addressable unit and the address generator makes the threshold grow with growing addresses, so that the generation of the lower amplitudes of the signals may be suppressed.

A possible application of the invention is the monitoring of thermal anomalies as they generally precede a conflagration. Conventional fire detectors monitor physical properties that correspond to a conflagration that is already burning. The present invention permits to predict and detect such an event by the monitoring of multiple sensors along a line at an earlier time. This application makes it necessary to gather the information from a great number of temperature sensors as the security of the recognition of such an event would otherwise not be sufficiently high to provide for a low prob ability of false alarms. This can be done in applying the invention, where the exceeding a minimal temperature along a minimal distance is the condition that will issue an alarm.

Another application of the present invention, that is especially promising is the simultaneous connection of temperature sensors and means for fire extinction to a common cable, where a local temperature override will be countered by local countermeasures. Such a device may be constructed similar to the example of FIG. 6.

Another application of the present invention is dose metering of radioactive radiation. One may attach dosemeters to a cable of the information input type, where sensor information is transmitted to the cable terminal processor. This cable may circumscribe a zone the dose and doserate of which can be determined at any instance. This may be a simple means to monitor sensible zones, for example nuclear power stations in a simple manner.

I claim:

1. An arrangement for addressing addressable units comprising:
   cable means comprising a ground wire means, an address wire means, a data wire means, and a supply wire means;
   multiple serially connected addressable unit, each addressable unit comprising
   an address detector,
   a switching means connected to said cable means; and
   a first impedance member which is situated between the address wire means and the ground wire means;
   an address generator for sending a standardized signal to said addressable units through said cable means;
   said standardized signal comprising a signal parameter that can be recognized and interpreted by said addressable units;
   wherein the addressable unit is activated for a predetermined time interval for information transmission when the signal parameter is recognized by the addressable unit;
   wherein before and during the activation of the addressable unit, the first impedance member are connected to the address wire means and the ground wire means by said switching means;
   wherein after the addressable unit becomes inactive after the predetermined time interval the first impedance member is disconnected to the address wire means by said switching means;
   wherein the total impedance of the cable means between the address generator and the next serially connected addressable unit following the inactivated addressable unit is increased to a total impedance sufficient to transmit the signal parameter to the next addressable unit;
   said cable means further comprises another first impedance parts between the address wire means and the ground wire means between two succeeding addressable units; wherein
   said another first impedance parts cause the total impedance of the cable means after the activated addressable unit to be independent of the number of succeeding not yet activated addressable units; and
   wherein the total impedance of the remaining cable means and the addressable units yet to be activated will be sufficient for the standardized signal to be sufficiently attenuated in the address wire means between the next addressable unit to be activated and the addressable unit following said next addressable unit; whereby both the next addressable unit to be activated and the addressable unit following said next addressable unit are not activated and prevents the detection of the standardized signal by the addressable unit following said next addressable unit.

2. The arrangement as set forth in claim 1, wherein said switching means has a first switching means to connect and separate the first impedance member with the address wire, and a second switching means to connect and separate a signal means with the data wire.

3. The arrangement as set forth in claim 2, wherein said first switching means is opened and said second switching means is closed following recognition of the signal parameter by the addressable unit; and wherein said second switching means is opened again after a delay which provides for information transmission.

4. The arrangement as set forth in claim 3, wherein said delay is produced by a delay generator comprising said first impedance member.

5. The arrangement as set forth in claim 4, wherein said first switching means has a controlling input and wherein said delay generator is connected to provoke a delayed opening of said second switch means after recognition of the parameter of the standardized signal by the addressing unit.

6. The arrangement as set forth in claim 1, wherein a second impedance member is connected in series with the address wire means.

7. The arrangement as set forth in claim 2, wherein said addressable units further comprise a reset circuit to bring said addressable unit to a normal state; wherein said first switching means is closed and said second switching means is open.

8. The arrangement as set forth in claim 1, wherein said addressing generator sends a standardized signal with increasing values of an electric property to the address detectors; and wherein the address detectors interpret the recognition of the parameter of the received signal that is destined for the addressable units.

9. The arrangement as set forth in claim 1, wherein said address detector comprises an output, and a strobe signal that changes state when the address detector recognizes the standardized signal.

10. The arrangement as set forth in claim 1, wherein said addressable unit comprises a sensor means for converting measurable physical information into a measured signal by transmission through the data wire means; and a current source means controlled by said sensor to produce a current signal proportional to the measured signal.

11. The arrangement as set forth in claim 1, wherein said addressable unit comprises an information output means.

12. The arrangement as set forth in claim 1, wherein a cable terminal processor means controls a connection of an address wire of a second device based upon the information signal from the addressable units.

13. The arrangement as set forth in claim 1, wherein said switching means further comprises:

a first switching means between an address signal input and the first impedance member;
wherein said first switching means is closed by a reset signal; a second switching means between an information means and a signaling means;
wherein an initial state of the first switching means is closed and the initial state of the second switching means is open; and
said address detector opens the first switching means and closes the second switching means for a certain duration after recognition of an addressing signal.

14. The arrangement of claim 13 wherein said information means is an information source; and said signaling means is a signal input means.

15. The arrangement of claim 13 wherein said information means is an information sink; and said signaling means is a signal output means.

16. The arrangement as set forth in claim 1, wherein the time interval wherein the addressable unit is activated is determined by the transmitting time of the standardized signal after recognition of the parameter.

17. The arrangement as set forth in claim 1, wherein the time interval wherein the addressable unit is activated is determined by the standardized signal charging a capacitor which will thereafter discharge through a resistor.

18. The arrangement as set forth in claim 1, said cable means comprising:

a wire means surrounded by an insulation means;
a clips-fastening means for fixing said addressable units form the outside to the cable by mechanical penetration of the insulation means of said cable;
wherein electrical contact is established between the addressable unit and the wire means.

19. A computer implemented method for addressing multiple addressable units connected by a cable in series with an address generator in an addressing device comprising the following steps:

bringing multiple addressable units, comprising a switching means and first impedance member, to a state wherein said addressable units are connected to said cable, and said addressable units are hindered from transmitting information by a reset signal;
producing a series of address signals by address generators;
sending said address signals through said cable;
activating the first addressable unit with a first address signal during a certain duration for transmitting information, wherein before and during the activation of the first addressable unit, the first impedance member is connected to the cable by said switching means;
transmitting information;
terminating transmission of information; and inactivating said first addressable unit by disconnecting the first impedance members to the cable by said switching means;
increasing the total impedance, of the cable between the address generator and the addressable unit following the inactivated addressable unit, sufficiently to allow a new address signal to be only detectable in the following addressable unit; and
bringing, after recognition of the address signal, the next following addressable unit, to a state for time-limited information transmission;
transmitting information;
terminating transmission of information; and inactivating the addressable unit; and
recognizing a parameter in the following address signal by the incremented impedance at the addressable unit.

20. The method as set forth in claim 19, wherein further comprising the steps of:

increasing the total impedance of the cable between the address generator and the addressable unit following the inactivated addressable unit, by opening the switching means connecting the cable to the first impedance member.

* * * * *